Dec. 25, 1945.    C. E. SORENSEN ET AL    2,391,524
VEHICLE TRACK CONSTRUCTION
Filed Jan. 28, 1943
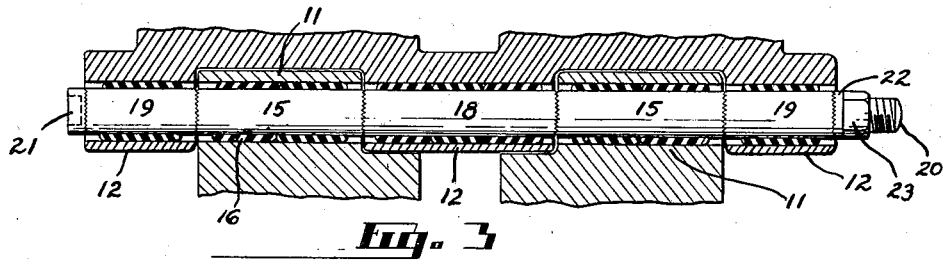
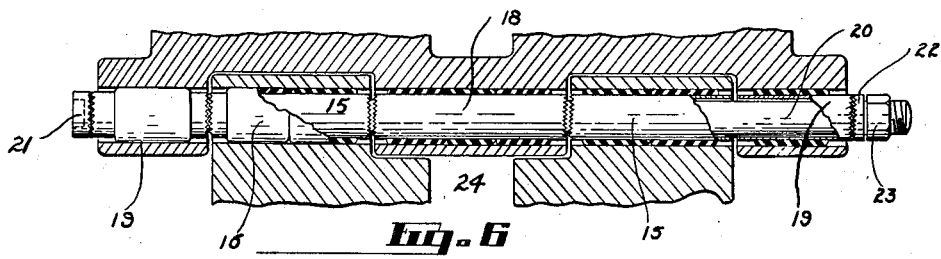
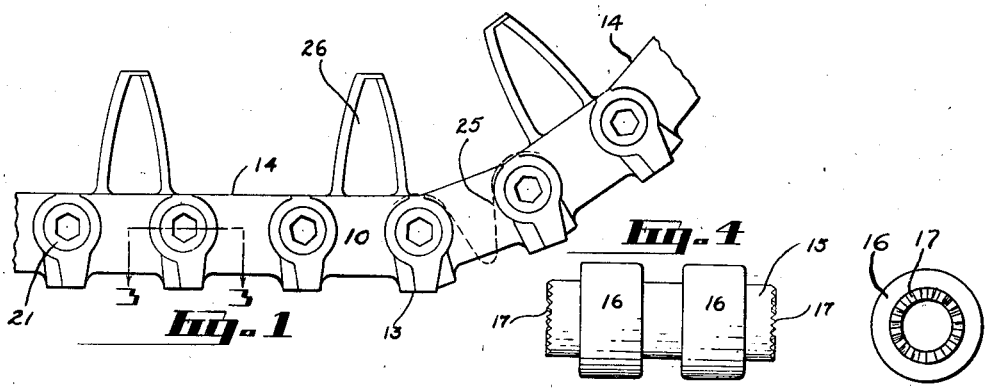
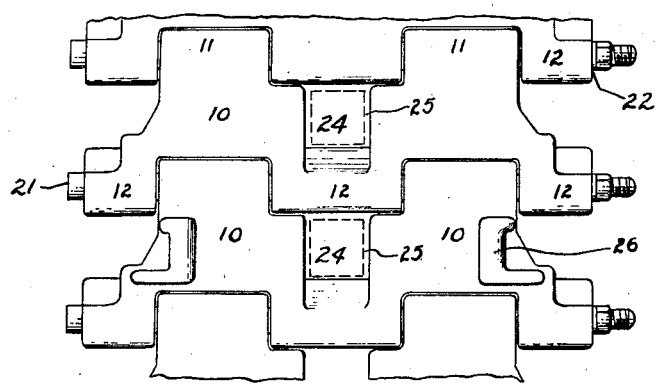
C. E. Sorensen
and
L. S. Sheldrick
INVENTORS.
Edwin C. McRae &
BY R. T. Harris
ATTORNEYS.

Patented Dec. 25, 1945

2,391,524

UNITED STATES PATENT OFFICE 2,391,524

VEHICLE TRACK CONSTRUCTION

Charles E. Sorensen, Detroit, and Laurence S. Sheldrick, Dearborn, Mich., assignors to Ford Motor Company, Dearborn, Mich., a corporation of Delaware Application January 28, 1943, Serial No. 473,770

3 Claims. (Cl. 305—10)

The object of our invention is to provide an improved track construction especially adapted for use on any track-laying vehicle. This invention is of special importance because of its adaptability to military vehicles.

Our improved track is of the link type wherein rigid links are hinged together to form a continuous track. The hinge pins which secure the links together are insulated from the links by rubber bushings, these bushings being under sufficient pressure that they grip both the links and pins and thereby flex in order to compensate for the relative angular movement of the links when the track rolls around a sprocket. No claim is made herein to the insulated pin construction in general, as it has been widely used for some time and has proved to be much superior to the older metal-to-metal hinge link construction.

However, the conventional insulated pin construction has one serious drawback and that is, the links are very difficult to separate when it is necessary to replace a link in the track. This difficulty arises because the rubber bushings which insulate the pins from the links must be compressed in position and this can be accomplished only by inserting the pins in the track links under relatively high pressure. The pressure required is so great that the pins cannot be removed in the field with any equipment now available. It is for this reason that the insulated pin construction has heretofore been used only with the block type of track construction in which block-type links are employed and the pins designed to extend entirely through each block. The outer ends of the pins are joined by connectors which are detachably secured thereto. Such connectors must keep the connected pins from oscillating relative to each other and therefore must tightly fit the associated pins. Consequently, if anything occurs to bend the ends of these pins, which often happens, many hours of labor are required to drive the connectors from the protruding ends of the pins.

In our improved track the insulated pin construction is employed but the links are so designed that they may be easily assembled or taken apart with equipment now available.

A further object of our invention is to provide an insulated pin track construction which will have a sheering resistance equivalent to that of the dry hinge link construction. As has been mentioned, insulated pins have heretofore been used only with the block-type track and thus the pins were subjected to sheer only at each end, giving a maximum sheer resistance of only twice the sheering strength of the pin. The conventional dry hinge construction had the hinge eyes interlocked to give as many sheer points as desired, thereby multiplying by many times the sheering strength of the pin. Four to six sheer points per pin were common practice. With our improved construction the hinge eyes may be interlocked to obtain this desirable feature for the first time in an insulated pin track construction.

Still a further object of our invention is to provide a track construction which can be produced without the expensive machine operation heretofore required. This permits quantity manufacture with less machines and in a shorter time.

With these and other objects in view our invention consists in the arrangement, construction and combination of the various parts of our improved track, as described in the specification, claimed in our claims and illustrated in the accompanying drawing, in which:

Figure 1 is a side elevation of our improved track construction;

Figure 2 is a plan view of the track, shown in Figure 1;

Figure 3 is a sectional view, taken on the line 3—3 of Figure 1;

Figure 4 is the side elevation of one of the bushings employed in our hinge construction;

Figure 5 is an end view of the bushing shown in Figure 4, and

Figure 6 is a view taken on line 3—3 of Figure 1, but differing from Figure 2 in that the link pin has been loosened so that the bushings in adjacent links become detached from each other.

Referring to Figures 1 and 2 of the drawing, it will be seen that our track construction comprises a plurality of substantially similar links 10, each of which consists of a steel casting having a pair of male hinge eyes 11 extending from one side with female hinge eyes 12 extending from the other side of the link. The bottom of each link member is formed with a tread 13, while the top face 14 of each link is relatively smooth to form a flat surface for the bogie wheels of the vehicle to roll upon. Guide lugs 26 project upwardly from each alternate link to maintain the track in alignment with the bogie wheels. The male hinge eyes 11 are provided with aligned hinge pin receiving bores therein, and the female hinge eyes 12 are likewise provided with aligned openings. The eyes 11 are of such length that they fit between the eyes 12 with about ⅛ of an inch clearance so that they may be easily installed.

Figures 4 and 5 illustrate the novel type of bushing employed in this track. The bushing shown is that used in the two male hinge eyes 11 and comprises a steel sleeve 15 having two axially-spaced rings of rubber 16 vulcanized thereon. The rubber rings 16 in their free position are considerably larger in diameter than the cylindrical bores in the eyes 11 but with suitable equipment may be pressed into these bores, in which position they flatten down to occupy substantially the full lengths of the bore. The bushings are shown in their installed positions in Figures 3 and 6. To install these bushings, heavy pressure must be used because the rubber rings must be compressed in the bore tight enough so that its periphery will not slide therein when the sleeve is oscillated. The purpose of the rubber is to flex and thereby compensate for oscillation of the links as the track rolls over a sprocket. This compensation must occur as flexure in the rubber rather than as sliding friction, otherwise the link will fail. The pressure required to install such bushings in place is of such magnitude that the bushings cannot be removed in the field with any equipment now available.

It will be noted from Figures 4 and 5 that both ends of each sleeve are radially serrated at 17. The purpose of the serrations 17 is to lock the adjacent sleeves against relative rotation. The free positions of the two bushings 18 are shown in Figure 6 from which it will be seen that the outer ends of the serrations are aligned with the ends of the hinge eyes 11. They thus offer no obstruction to the insertion of the eyes 11 into interlocking engagement with the eyes 12 of the adjacent link.

The female hinge eyes 12 are provided with similar sleeve members; the center sleeve, however, is longer than the two end sleeves and due to this increased length, the center sleeve is provided with three rings of rubber vulcanized thereon while the end sleeves have one ring of rubber thereon. A greater number of these rubber rings is required for a longer sleeve because of the limited amount through which the bushings can be squeezed lengthwise. The center sleeve has been numbered 18, while the two end sleeves have been numbered 19. All the sleeves 15, 18 and 19 are in alignment and both ends of each sleeve are provided with serrations. The sleeves 19 are the same length as the outside hinge eyes 12, while sleeve 18 is the same length as the center hinge eye 12.

As has been mentioned, the links are so cast that the eyes 11 may be freely inserted between the eyes 12 of the adjacent link. Inasmuch as the sleeves 15, 18 and 19 do not project from either side of their respective hinge eyes, they offer no resistance to the coupling of adjacent links.

When the links have been aligned, as shown in Figure 6, a bolt 20 is inserted through the aligned sleeves. There is sufficient clearance between the bolt and the inside diameter of these sleeves that the bolt slides freely into position. The head 21 of the bolt 20 is provided with serrations similar to those on the sleeves; and likewise, a serrated washer 22 is provided over the other end of the assembled sleeves. A nut 23 is then screwed on the end of the bolt. The nut 23 is tightened down until the head 21 and washer 22 coact with the outside ends of sleeves 19. Further tightening of the nut moves the two sleeves 19 inwardly so that their inner serrated ends abut against the outer ends of the sleeves 15. Still further tightening of the nut moves the sleeves 15 and 19 as units against the opposite ends of the center sleeve 18. The nut is then tightened down so the sleeves form a solid cylindrical assembly. The serrated ends of the sleeves interlock so that none of these may turn relative to each other or to the bolt 20, thereby forming a continuous pivot pin through the full length of the hinge, supported on rubber under compression in both adjacent links.

When it is desired to remove a link from this track, the nut 23 is loosened and the rubber bushings which have been flexed inwardly upon tightening the bolt, then return to their original positions. The sleeves 15 first draw away from sleeves 18 and then after these have assumed their normal position, the sleeves 19 draw away from the sleeves 15. The bolt 20 may then be removed and as there is no contact between the adjacent bushings, the links can freely be taken out from the adjacent links. This is a decided advantage over any other insulated track construction known to the applicants.

It will be noted that a slot 24 is provided in each link between the eyes 11, which slot extends through the link to the opposite eye 12. This eye is of circular cross-section so that a sprocket tooth, shown by dotted lines 25, may enter therein to drive the track. Driving force is thus transmitted directly to the track links and not first to the pins as in the block-type construction. Tension on the track is resisted by a shearing action on the bolt 20 at four points throughout its length. This has a considerable advantage over the older type of track in which the pins were connected only by links at their outer ends. In this construction each pin is under a sheer stress only at the extreme outer end. The result is that our improved track construction will resist a tensile load substantially twice that of the usual insulated hinge type of construction of equivalent size.

Still a further advantage results in that the links are relatively inexpensive to manufacture, each being composed of only a simple casting having cored or machined hinge openings therein. In the disclosed application of this invention, these openings have been machined, but it is entirely possible that cored openings will be satisfactory.

Some changes may be made in the arrangement, construction and combination of the various parts of our improved device without departing from the spirit of our invention, and it is our intention to cover by our claims such changes as may reasonably be included within the scope thereof.

We claim as our invention:

1. A track construction comprising, a plurality of track links having male and female hinge members formed on opposite ends thereof, a male hinge member of one link engaging female hinge members on an adjacent link, said interengaging link members having aligned openings therein, separate sleeves resiliently mounted in each of said hinge members upon rubber bushings, said bushing being installed in position under relatively high pressure whereby both rotary and axial movement of the sleeves relative to said hinge members are resisted by flexure of said rubber bushings, the adjacent ends of said sleeves having serrations formed thereon, and means for drawing said sleeves axially against the resistance of said rubber bushings into position where said serrations engage each other, said last-named means being loosely received within said sleeves and means to prohibit relative rotation of said sleeves therewith.

2. A track construction comprising, a plurality of link members having male and female hinge members formed on opposite ends thereof, a male member of one link engaging female members of an adjacent link, a separate sleeve resiliently mounted in each of said members for axial movement relative thereto, interlocking serrations at the ends of said sleeves, a bolt loosely insertable through said sleeves when in aligned position and effective to move said sleeves axially into locking end-to-end engagement of said serrations, and means associated with said bolt to interlock with the outermost serrations in said sleeves.

3. The structure of claim 2, which is further characterized in that said bolt has a head and a shank loosely received in said sleeves and a threaded portion engaging a nut, said last-named interlocking means being associated with said head and said nut to engage the outermost serrations on said sleeves and prohibit relative rotation of said sleeves and said bolt.

CHARLES E. SORENSEN.
LAURENCE S. SHELDRICK.